(12) United States Patent
Matsumoto

(10) Patent No.: US 8,213,677 B2
(45) Date of Patent: Jul. 3, 2012

(54) MOTION MEASURING DEVICE, MOTION MEASURING SYSTEM, IN-VEHICLE DEVICE, MOTION MEASURING METHOD, MOTION MEASUREMENT PROGRAM, AND COMPUTER-READABLE STORAGE MEDIUM

(75) Inventor: Yoshio Matsumoto, Ikoma (JP)

(73) Assignee: National University Corporation NARA Institute of Science and Technology, Nara (JP)

( * ) Notice: Subject to any disclaimer, the term of this patent is extended or adjusted under 35 U.S.C. 154(b) by 1090 days.

(21) Appl. No.: 11/885,428

(22) PCT Filed: Mar. 3, 2006

(86) PCT No.: PCT/JP2006/304049
§ 371 (c)(1),
(2), (4) Date: May 9, 2008

(87) PCT Pub. No.: WO2006/093250
PCT Pub. Date: Sep. 8, 2006

(65) Prior Publication Data
US 2008/0219501 A1  Sep. 11, 2008

(30) Foreign Application Priority Data
Mar. 4, 2005  (JP) .................................. 2005-061323

(51) Int. Cl.
*G06K 9/00* (2006.01)
(52) U.S. Cl. .......................... 382/103; 382/107; 348/143
(58) Field of Classification Search .................. 382/103, 382/107; 348/143
See application file for complete search history.

(56) References Cited

U.S. PATENT DOCUMENTS

| | | | |
|---|---|---|---|
| 7,003,134 B1 * | 2/2006 | Covell et al. ................... | 382/103 |
| 7,653,213 B2 * | 1/2010 | Longhurst et al. ............. | 382/103 |
| 7,813,544 B2 * | 10/2010 | Fukaya et al. ................ | 382/155 |

(Continued)

FOREIGN PATENT DOCUMENTS

JP  02-165283  6/1990

(Continued)

OTHER PUBLICATIONS

Sidenbladh et al., "Stochastic Tracking of 3D Human Figures Using 2D Image Motion", 2000, Springer-Verlag, ECCV 2000, 702-718.*

(Continued)

*Primary Examiner* — Sath V Perungavoor
*Assistant Examiner* — Katrina Fujita
(74) *Attorney, Agent, or Firm* — Harness, Dickey & Pierce, P.L.C.

(57) ABSTRACT

An embodiment of the present invention includes: a tracking object image extracting section that extracts a tracking object image, which represents a tracking object, from an image captured by a monocular camera; a two-dimensional displacement calculating section that calculates, as actual movement amounts, amounts of inter-frame movement of the tracking object image; a two-dimensional plane projecting section that generates on a two-dimensional plane a projected image of a three-dimensional model, which represents in three dimensions a capturing object captured by the monocular camera; a small motion generating section that calculates, as estimated movement amounts, amounts of inter-frame movement of the projected image; and a three-dimensional displacement estimating section that estimates amounts of three-dimensional motion of the tracking object on the basis of the actual movement amounts and the estimated movement amounts.

5 Claims, 7 Drawing Sheets

U.S. PATENT DOCUMENTS

2004/0153229 A1* 8/2004 Gokturk et al. .................. 701/45
2004/0175039 A1* 9/2004 Miller .......................... 382/181

FOREIGN PATENT DOCUMENTS

| JP | 2-165283 | 6/1990 |
| JP | 07-264458 | 10/1995 |
| JP | 7-264458 | 10/1995 |
| JP | 2002-269546 | 9/2002 |
| WO | WO 2004/088348 | * 10/2004 |

OTHER PUBLICATIONS

Michael J. Black et al. "Tracking and Recognizing Rigid and Non-Rigid Facial Motions using Local Parametric Models of Image Motion." Proc. Fifth Int. Conf. on Computer Vision, Boston, Jun. 1995.

Marco La Cascia et al. "Fast, Reliable Head Tracking under Varying Illumination: An approach Based on Registration of Texture-Mapped 3D Models." IEEE Transactions on pattern analysis and machine intelligence, vol. 22, No. 4, Apr. 2000.

Sumit Basu et al. "Motion Regularization for Model-Based Head Tracking." Proceedings of the International Conference on Pattern Recognition (ICPR '96) vol. III-vol. 7276, p. 611, Aug. 25-29, 1996.

Yoshio Matsumoto et al. "An Algorithm for Real-time Stereo Vision Implementation of Head Pose and Gaze Direction Measurement." Proceedings of IEEE Fourth International Conference on Face and Gesture Recognition (FG'2000), pp. 499-505, 2000.

Carlo Tomasi et al. "Shape and Motion from Image Streams: a Factorization Method—Part 3: Detection and Tracking of Point Features." Technical Report CMU-CS-91-132, CMU, 1991.

* cited by examiner

FIG. 4

| COORDINATES OF FEATURE OF PROJECTED IMAGE (PREVIOUS FRAME) | STANDARD MOTIONS | ESTIMATED MOVEMENT AMOUNTS (PRESENT FRAME) |
|---|---|---|
| $(x_a, y_a)$ | X-AXIS TRANSLATION | $(x_{a1}, y_{a1})$ |
| | Y-AXIS TRANSLATION | $(x_{a2}, y_{a2})$ |
| | Z-AXIS TRANSLATION | $(x_{a3}, y_{a3})$ |
| | X-AXIS ROTATION | $(x_{a4}, y_{a4})$ |
| | Y-AXIS ROTATION | $(x_{a5}, y_{a5})$ |
| | Z-AXIS ROTATION | $(x_{a6}, y_{a6})$ |
| $(x_b, y_b)$ | X-AXIS PARALLEL MOVEMENT | $(x_{b1}, y_{b1})$ |
| | Y-AXIS PARALLEL MOVEMENT | $(x_{b2}, y_{b2})$ |
| | Z-AXIS PARALLEL MOVEMENT | $(x_{b3}, y_{b3})$ |
| | X-AXIS ROTATION | $(x_{b4}, y_{b4})$ |
| | Y-AXIS ROTATION | $(x_{b5}, y_{b5})$ |
| | Z-AXIS ROTATION | $(x_{b6}, y_{b6})$ |
| ⋮ | ⋮ | ⋮ |

FIG. 7
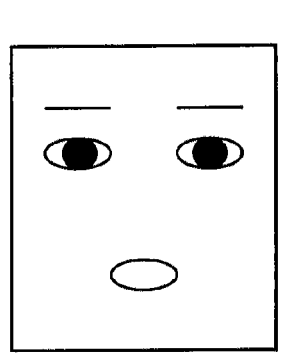
PLANAR
FORM
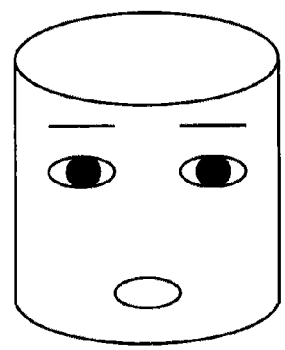
CYLINDRICAL
FORM
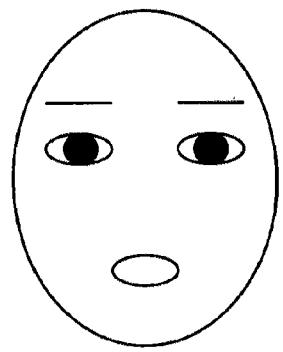
ELLIPSOID
FORM

MOTION MEASURING DEVICE, MOTION MEASURING SYSTEM, IN-VEHICLE DEVICE, MOTION MEASURING METHOD, MOTION MEASUREMENT PROGRAM, AND COMPUTER-READABLE STORAGE MEDIUM

TECHNICAL FIELD

The present invention relates to a motion measuring device, a motion measuring system, an in-vehicle device, a motion measuring method, a motion measurement program, and a computer readable storage medium, for tracking motion of a capturing object captured by a camera.

BACKGROUND ART

Conventionally, in order to obtain quantitative motion of a capturing object on the basis of an image (captured image) of a human face or others captured by a monocular camera, a simplified model representing the capturing object was hypothetically generated to obtain motion of the model from motion on the captured image.

For example, to obtain quantitative motion of a human face from a captured image of the human face, models as illustrated in FIG. 7 were used, which are a model representing a human face in planar form (see Non-patent document 1), a model representing a human face in cylindrical form (see Non-patent document 2), and a model representing a human face in ellipsoid form (see Non-patent document 3).

Also, in obtaining quantitative motion of the capturing object on the basis of the image captured by the monocular camera as in the above-mentioned method, a camera model was simplified by orthographic transformation or weak perspective transformation, for example.

Further, there can be a case where quantitative motion of the capturing object on the basis of an image captured by a stereo camera, instead of a monocular camera (see Non-patent document 4). In this case, it is possible to measure the position and posture of the capturing object with accuracy by directly fitting in three dimensions (a) three-dimensional coordinate values of the capturing object, which values are obtained from an image captured by the stereo camera, and (b) a three-dimensional model of the capturing object.

[Non-Patent Document 1]
M. J. Black and Y. Yacoob. Tracking and recognizing rigid and non-rigid facial motions using local parametric models of image motions. ICCV, 1995

[Non-Patent Document 2]
M. L. Cascia, S. Sclaroff and V. Athitsos: "Fast, Reliable Head Tracking under Varying Illumination: An Approach Based on Registration of Texture-Mapped 3D Models", IEEE PAMI, vol. 22, no. 4, April 2000.

[Non-Patent Document 3]
S. Basu, I. Essa, A. Pentland: "Motion Regularization for Model-Based Head Tracking", Proceedings of the International Conference on Pattern Recognition (ICPR '96) Volume III-Volume 7276, p. 611, Aug. 25-29, 1996

[Non-Patent Document 4]
Yoshio Matsumoto, Alexander Zelinsky: "An Algorithm for Real-time Stereo Vision Implementation of Head Pose and Gaze Direction Measurement", Proceedings of IEEE Fourth International Conference on Face and Gesture Recognition (FG '2000), pp. 499-505, 2000

[Non-Patent Document 5]
Tomasi, Kanade: "Shape and motion from image streams: a factorization method," Technical Report CMU-CS-91-132, CMU, 1991

DISCLOSURE OF INVENTION

However, the aforementioned conventional art has the following problems.

First, by using the simplified model of the capturing object in the technique of obtaining motion of the capturing object with the use of a monocular camera, motion measurement accuracy decreases. Similarly, even when the camera model is simplified, motion measurement accuracy decreases.

Secondly, in the technique of obtaining motion of the capturing object with the use of a stereo camera, which basically has two lenses, calibration of physical relationship between the two lenses can be a cumbersome task.

Furthermore, since the stereo camera has two lenses, the stereo camera is not only larger in size than the monocular camera, but also involves high costs. Therefore, the use of the stereo camera gives rise to issues concerning space saving and cost-reduction.

The present invention has been attained in view of the above problems of the conventional art. An object of the present invention is to provide a motion measuring device, a motion measuring system, an in-vehicle device, a motion measuring method, a motion measurement program, and a computer-readable storage medium, all of which allow motion of the capturing object to be measured with accuracy and with a low-cost and compact arrangement.

In order to solve the above-mentioned problems, a motion measuring device of the present invention includes: tracking object image extracting means that extracts a tracking object image, which represents a tracking object, from a motion image captured by a monocular camera, on the basis of a feature of the tracking object; actual movement amount calculating means that calculates amounts of inter-frame movement of the tracking object image as actual movement amounts; two-dimensional plane projecting means that generates on a two-dimensional plane a projected image of a three-dimensional model, which represents in three dimensions a capturing object captured by the monocular camera; estimated movement amount calculating means that calculates respective amounts of inter-frame movement of the projected image as estimated movement amounts with respect to six degrees of freedom regarding movement of the three-dimensional model, when the three-dimensional model makes movements respectively corresponding to the six degrees of freedom; and three-dimensional displacement estimating means that estimates amounts of three-dimensional motion of the tracking object respectively corresponding to the six degrees of freedom, by using a linear equation in which the actual movement amount and the estimated movement amounts are associated with each other.

According to the above arrangement, the actual movement amount calculating means calculates the actual movement amounts of the tracking object image extracted by the tracking object image extracting means. Meanwhile, the estimated movement amount calculating means calculates the estimated movement amounts from the projected image of the three-dimensional model generated by the two-dimensional plane projecting means.

What the actual movement amounts and the estimated movement amounts have in common is that they are values indicating amounts of inter-frame movement of the capturing object captured by the monocular camera. Especially, the actual movement amount is a value obtained on the basis of a motion image captured by the monocular camera. Therefore, it can be understood that the actual movement amount is a value two-dimensionally indicating the amount that the tracking object has actually moved. The estimated movement amount is a value calculated from the three-dimensional model of the capturing object. Therefore, it can be said that the estimated movement amount is a value three-dimensionally indicating movement of the tracking object.

Thus, the three-dimensional displacement estimating means can estimate the amounts of three-dimensional motion of the tracking object by matching the actual movement amounts and the estimated movement amounts when actual movement occurs. In addition, since the motion measuring device uses the three-dimensional model of the capturing object, it is possible to estimate the amounts of motion of the tracking object with accuracy.

Three-dimensional movement is basically expressed by six degrees of freedom. According to the above arrangement, since the estimated movement amount calculating means calculates respective estimated amounts of movement of the three-dimensional model when the three-dimensional model makes movements with respect to six degrees of freedom, it is possible to accurately calculate three-dimensional movement of the three-dimensional model.

Accordingly, according to the above arrangement, it is possible to accurately calculate three-dimensional motion of the tracking object.

Still further, the three-dimensional displacement estimating means estimates the amount of motion by using a linear equation in which the actual movement amount and the estimated movement amounts are associated with each other.

According to the above arrangement, since the actual movement amount and the estimated movement amounts are associated with each other in the linear equation, it is possible to estimate the amounts of three-dimensional motion of the tracking object by a simple process. Therefore, it is possible to measure three-dimensional motion of the tracking object by an efficient process.

Besides, according to the present invention, since the motion measuring device uses the monocular camera, it is possible to measure the three-dimensional motion of the tracking object at low cost, and the motion measuring device can be used in a small space.

In order to solve the above-mentioned problems, a motion measuring method of the present invention includes: a first step of extracting a tracking object image, which represents a tracking object, from a motion image captured by a monocular camera, on the basis of a feature of the tracking object; a second step of calculating, as actual movement amounts, amounts of inter-frame movement of the tracking object image; a third step of generating on a two-dimensional plane a projected image of a three-dimensional model, which represents in three dimensions a capturing object captured by the monocular camera; a fourth step of calculating respective amounts of inter-frame movement of the projected image as estimated movement amounts with respect to six degrees of freedom regarding movement of the three-dimensional model, when the three-dimensional model makes movements respectively corresponding to the six degrees of freedom; and a fifth step of estimating amounts of three-dimensional motion of the tracking object respectively corresponding to the six degrees of freedom, by using a linear equation in which the actual movement amount and the estimated movement amounts are associated with each other.

According to the above-arranged motion measuring method, since the processes in the first to fifth steps are similar to the processes performed by the motion measuring device of the present invention, it is possible to obtain effects similar to the effect of the motion measuring device of the present invention.

According to the motion measuring device of the present invention, since the three-dimensional model of the capturing object is used, it is possible to estimate the amounts of motion of the tracking object with accuracy. Besides, according to the present invention, since the motion measuring device of the present invention uses the monocular camera, it is possible to measure the three-dimensional motion of the tracking object at low cost, and the motion measuring device can be used in a small space.

BRIEF DESCRIPTION OF DRAWINGS

FIG. 4 is a diagram illustrating the structure of a motion table used by the tracking device illustrated in FIG. 1.

FIG. 7 is a view illustrating face models used in the conventional motion measurement.

EXPLANATION OF REFERENCE NUMERALS

1 Tracking device (motion measuring device)
2 Tracking object image extracting section (tracking object image extracting means)
3 Two-dimensional plane projecting section (two-dimensional plane projecting means)
4 Small motion generating section (estimated movement amount calculating means)
6 Two-dimensional displacement calculating section (actual movement amount calculating means)
7 Three-dimensional displacement estimating section (three-dimensional displacement estimating means)
8 Capturing object motion measuring section
10 Capturing object

BEST MODE FOR CARRYING OUT THE INVENTION

1. Device Configuration Outline

Figure 1:
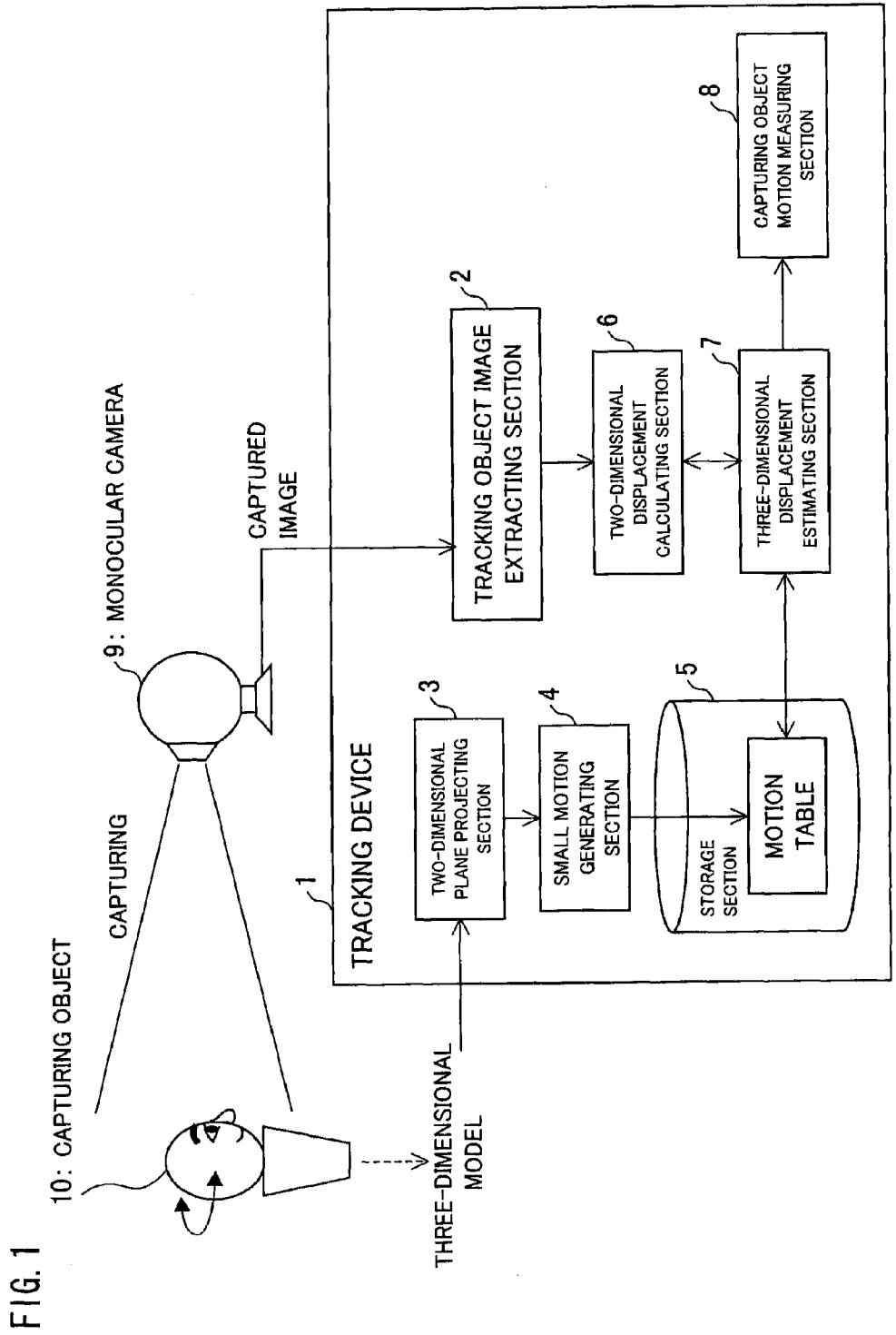
FIG. 1 is a view illustrating the configuration of a tracking device according to an embodiment of the present invention.

First of all, the configuration of a tracking device (motion measuring device) according to an embodiment of the present invention will be described with reference to FIG. 1. As illustrated in FIG. 1, the tracking device 1 of the present embodiment includes a tracking object image extracting section (tracking object image extracting means) 2, a two-dimensional plane projecting section (two-dimensional plane projecting means) 3, a small motion generating section (estimated movement amount calculating means) 4, a storage section 5, a two-dimensional displacement calculating section (actual movement amount calculating means) 6, three-dimensional displacement estimating section (three-dimensional displacement estimating means) 7, and a capturing object motion measuring section 8.

The tracking object image extracting section 2 extracts, from a motion image (captured image) of a capturing object 10 which has been captured by a monocular camera 9, an image (tracking object image) of an object subjected to tracking (tracking object) in the capturing object. Also, the tracking object image extracting section 2 tracks features of the tracking object image in different frames. It should be noted that each feature has coordinates that characterize an image. In the case of an image of a human face, the features correspond to coordinates indicating the location of the outer corners of eyes, the inner corners of eyes, lips, nose, or other parts.

The processes performed by the tracking object image extracting section 2 can be various kinds of image feature extracting processes. For example, assume that a human image is captured and the tracking object is a human face. In this case, a process of extracting the tracking object image can be realized by a process of recognizing distinctive parts of the face, such as eyes, a mouth, and a nose, in the captured image. It should be noted that a technique using the template matching method as the image feature extracting process is disclosed in Non-patent document 4.

The two-dimensional plane projecting section 3 matches the posture of a model three-dimensionally describing the shape of the capturing object 10 (hereinafter referred to as three-dimensional model) with the posture of the capturing object 10 in each frame. Then, the two-dimensional plane projecting section 3 calculates coordinates of an image (hereinafter referred to as projected image) formed by projecting on a two-dimensional plane the three-dimensional model of which posture has been matched. A projecting process performed by the two-dimensional plane projecting section 3 will be described in detail later.

The three-dimensional model is generated in advance by a known procedure before the tracking device 1 obtains motion of the tracking object. For example, it is possible to construct the three-dimensional model by three-dimensionally measuring the capturing object by means of a stereo camera or a three-dimensional scanner (see Non-patent document 4). Moreover, it is possible to construct the three-dimensional model by tracking the feature of the capturing object by means of a monocular camera (see Non-patent document 5).

The small motion generating section 4 calculates the respective amounts of movement of the projected image of the three-dimensional model in each frame of the captured image in X-axis and Y-axis directions assuming the three-dimensional model made standard motions. The two-dimensional plane projecting section 3 performs a process of obtaining coordinates of the projected image. The process of calculating the amounts of movement in the small motion generating section 4 will be described in detail later. The following description assumes that the amounts of movement calculated by the small motion generating section 4 are especially "estimated movement amounts". Each of the estimated movement amounts, which indicates respective moving distances in the X-axis and Y-axis directions, is expressed by a vector.

Here, "standard motions" means six motions for expressing movement of the three-dimensional model in three dimensions. More specifically, the "standard motions" herein are (a) a motion of the three-dimensional model moving by a small unit distance in parallel to each of an X-axis, a Y-axis, and a Z-axis that define three dimensions and (b) a motion of the three-dimensional model rotating by a small unit angle with respect to each of the X-axis, the Y-axis, and the Z-axis. In the following description, the six standard motions are defined as follows:

"X-axis translation" which is a motion of the three-dimensional model moving by a unit distance in parallel to the X-axis;

"Y-axis translation" which is a motion of the three-dimensional model moving by a unit distance in parallel to the Y-axis;

"Z-axis translation" which is a motion of the three-dimensional model moving by a unit distance in parallel to the Z-axis;

"X-axis rotation" which is a motion of the three-dimensional model rotating by a unit angle with respect to the X-axis;

"Y-axis rotation" which is a motion of the three-dimensional model rotating by a unit angle with respect to the Y-axis; and "Z-axis rotation" which is a motion of the three-dimensional model rotating by a unit angle with respect to the Z-axis.

The storage section 5 stores a motion table (described later) in which coordinates of the projected image which coordinates are calculated by the two-dimensional plane projecting section 3, the standard motions, and the amounts of movement of coordinates on a two-dimensional plane which amounts are calculated by the small motion generating section 4 are associated with each other.

The two-dimensional displacement calculating section 6 calculates the amount of inter-frame movement in coordinates of each feature of the tracking object image. More specifically, the two-dimensional displacement calculating section 6 calculates distances by which the feature of the tracking object image has actually moved during a time from a previous frame to a present frame, with respect to the X-axis and Y-axis directions. The following description assumes that the amount of movement calculated by the two-dimensional displacement calculating section 6 is "actual movement amount". The actual movement amount, which indicates respective moving distances in the X-axis and Y-axis directions, is expressed by a vector.

The three-dimensional displacement estimating section 7 reads out from the motion table stored in the storage section 5 the estimated movement amounts, and associates the actual movement amounts calculated by the two-dimensional displacement calculating section 6 with the estimated movement amounts so as to estimate the amounts of three-dimensional motion of the tracking object (three-dimensional displacements) by the procedure which will be described later.

The capturing object motion measuring section 8 measures what motion the capturing object has performed, on the basis of the three-dimensional displacement of the tracking object which displacement is estimated by the three-dimensional displacement estimating section 7. For example, assume that the tracking object is a human face. In this case, the capturing object motion measuring section 8 measures what motion the human who is the capturing object has performed of motions including movement of eyes, blinking, and opening/closing of a mouth, on the basis of the three-dimensional displacement of the tracking object.

A series of processes performed until the above-arranged tracking device 1 measures motion of the capturing object will be described with reference to a flowchart of FIG. 2. The following description assumes that the capturing object 10 is a human, and the tracking object is a human face. A three-dimensional model of the human face is simply referred to as "three-dimensional face model".

Figure 2:
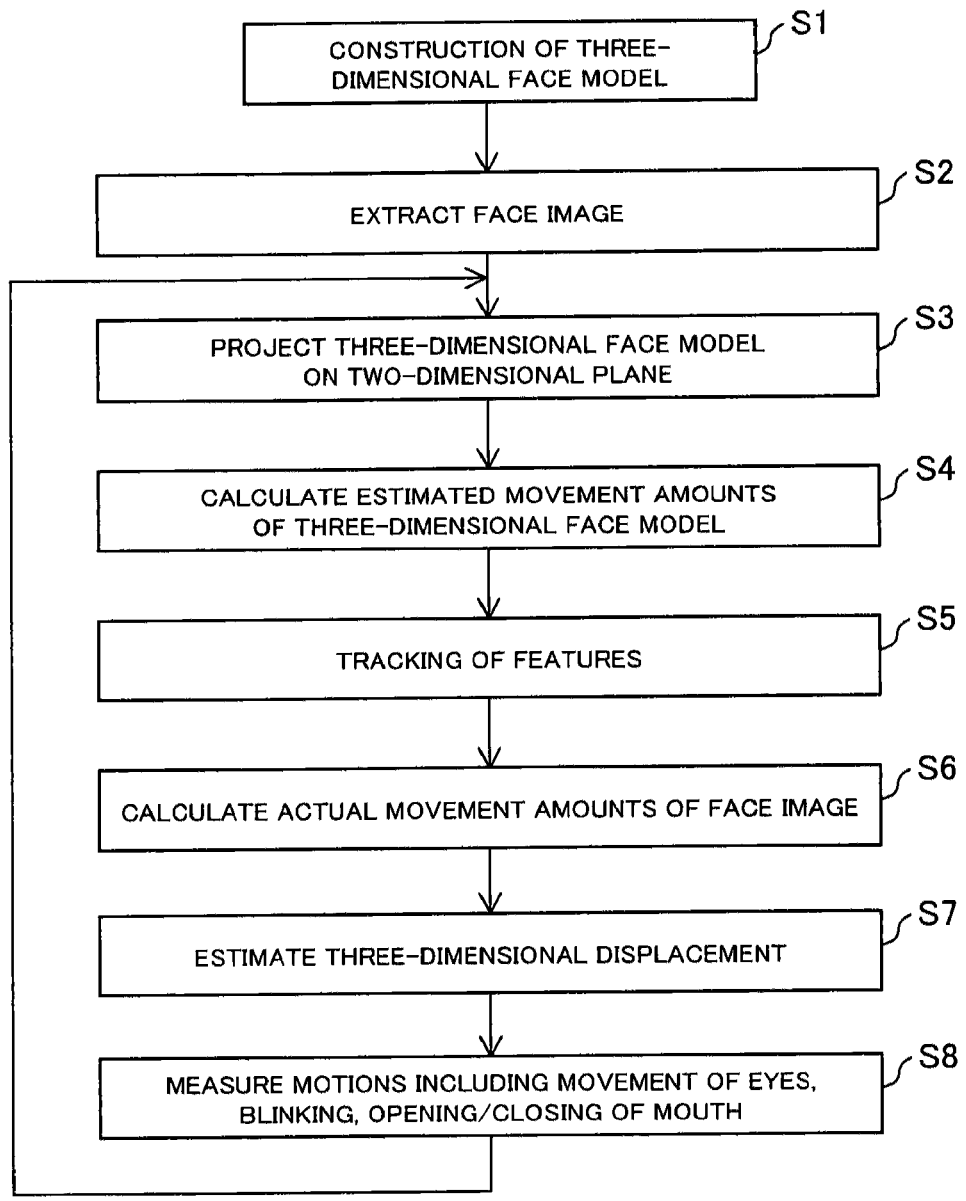
FIG. 2 is a flowchart illustrating a flow of processes performed by the tracking device illustrated in FIG. 1.

To begin with, prior to a tracking process performed by the tracking device 1, a three-dimensional face model is constructed as illustrated in FIG. 2 (Step 1; hereinafter "Step" is abbreviated as S). Then, the tracking object image extracting section 2 extracts from an image of the human captured by the monocular camera 9 an image of the human face (face image) as the tracking object image (S2).

Thereafter, the two-dimensional plane projecting section 3 projects the three-dimensional face model on a two-dimensional plane (S3). The small motion generating section 4 calculates estimated movement amounts of the three-dimensional face model (S4).

The tracking object image extracting section 2 tracks the feature of the face image in different frames (S5). Subsequently, the two-dimensional displacement calculating section 6 calculates the actual movement amounts of the features of the face image and its reliability (S6). The processes in S5 and S6 may be performed before the processes in S3 and S4.

After the processes in S3 through S6 are completed, the three-dimensional displacement estimating section 7 calculates three-dimensional displacement of the human face that is the tracking object (S7). Then, the capturing object motion measuring section 8 measures, on the basis of the three-dimensional displacement estimated in S7, what motion the human has performed of the motions including movement of eyes, blinking, and opening/closing of a mouth (S8).

By completing the processes in S1 through S8, how the human who is the capturing object has moved is determined by the tracking device 1. The following will describe details of the processes performed by the blocks in the tracking device 1.

2. Process Performed by the Two-Dimensional Plane Projecting Section 3

Figure 3:
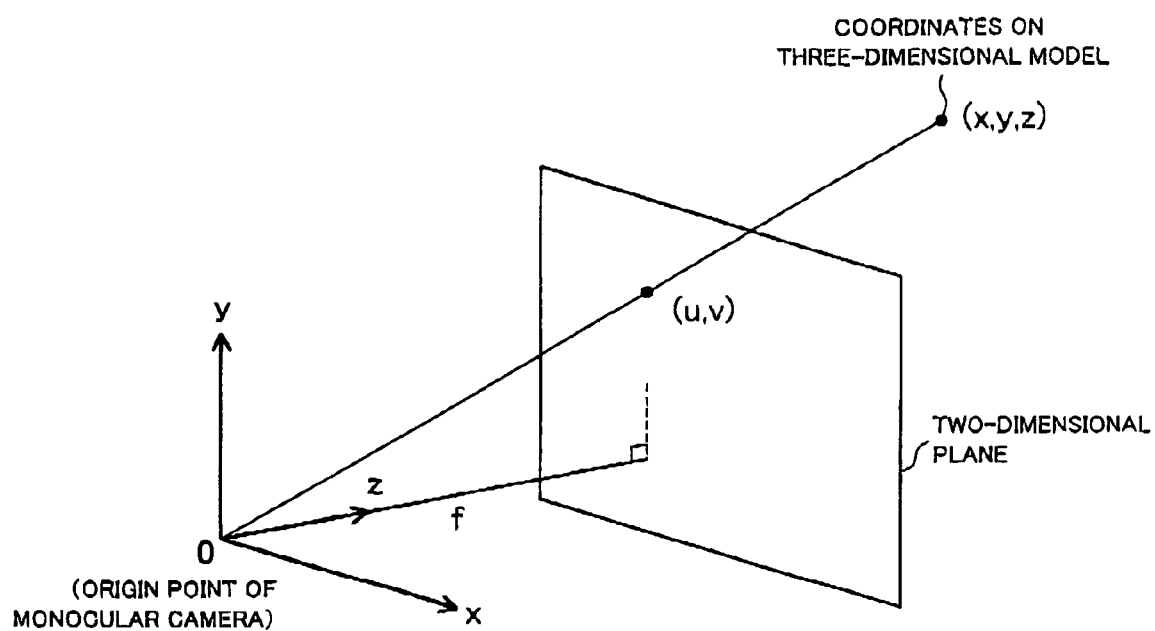
FIG. 3 is an explanatory view of the procedure in which a three-dimensional model is projected on a two-dimensional plane.

The following will describe the procedure in which the two-dimensional plane projecting section 3 projects a three-dimensional model on a two-dimensional plane. As illustrated in FIG. 3, the two-dimensional plane on which the three-dimensional model is projected in three dimensions defined by X-axis, Y-axis, and Z-axis is assumed to be a plane located at a distance f from an origin point. The origin point of the three dimensions is regarded as a focus of the monocular camera 9. The distance f between the origin point and the two-dimensional plane is regarded as a focal length of the monocular camera 9.

In a case where a model of the camera is a pinhole camera model, a projecting method is perspective transformation. When (u, v) are coordinates on the projected image corresponding to coordinates (x, y, z) at any given location on the three-dimensional model, the coordinates (u, v) can be obtained by the following equation (1).

$$u = f \times x / Z, v = f \times y / Z \quad \text{(Equation 1)}$$

Then, the coordinates (x, y, z) are appropriately changed as coordinates on the three-dimensional model. By calculating the coordinates (u, v) by Equation (1), the process of obtaining coordinates of the entire projected image is completed.

3. Process Performed by the Small Motion Generating Section 4

The following will describe the procedure in which the small motion generating section 4 calculates the estimated movement amounts of the projected image corresponding to the three-dimensional model.

To begin with, the small motion generating section 4 obtains coordinates at which the feature of the three-dimensional model in the previous frame will be described on the projected image. For example, assume that two features of the three-dimensional model are point A and point B. In this case, the small motion generating section 4 obtains coordinates ($x_a$, $y_a$) corresponding to the point A on the projected image, and obtains coordinates ($x_b$, $y_b$) corresponding to the point B on the projected image. The coordinates ($x_a$, $y_a$) and ($x_b$, $y_b$) correspond to the points A and B in the previous frame, respectively.

Then, the small motion generating section 4 calculates how much coordinates of the feature on the two-dimensional plane could move during a time between and the previous frame and the present frame if the three-dimensional model performed the standard motion. More specifically, the small motion generating section 4 calculates the amounts of movement of the feature on the two-dimensional plane, regarding the foregoing standard motions that the three-dimensional model performs, i.e. "X-axis translation", "Y-axis translation", "Z-axis translation", "X-axis rotation", "Y-axis rotation", and "Z-axis rotation".

Further, the small motion generating section 4 generates a motion table in which the thus obtained estimated movement amounts of the features, the coordinates of the features of the projected image in the previous frame, and the standard motions are associated with each other. Then, the small motion generating section 4 stores the motion table in the storage section 5.

FIG. 4 illustrates the structure of the motion table. As illustrated in FIG. 4, the motion table is such that each of the coordinates ($x_a$, $y_a$) and ($x_b$, $y_b$) of the feature of the projected image is associated with six standard motions and their respective estimated movement amounts. As a matter of course, the coordinates of the feature stored in the motion table is coordinates in the previous frame.

The motion table is sequentially updated in each frame. That is, when the estimated movement amounts stored in the motion table have been used for the below-mentioned process of estimating the three-dimensional displacement, coordinates of the feature of the projected image in the present frame are stored in the motion table. Then, estimated movement amounts between the present frame and the subsequent frame regarding the standard motions are obtained by the small motion generating section 4 and stored in the motion table.

4. Process Performed by the Three-Dimensional Displacement Estimating Section 7

The following will describe the process in which the three-dimensional displacement estimating section 7 estimates three-dimensional displacement of the tracking object. To begin with, the three-dimensional displacement estimating section 7 refers to the motion table stored in the storage section 5 to read out estimated movement amounts respectively corresponding to the six standard motions. At the same time, the three-dimensional displacement estimating section 7 obtains the actual movement amounts that have been calculated by the two-dimensional displacement calculating section 6.

What the actual movement amounts and the estimated movement amounts are like has been described previously. For the reference purpose, the actual movement amounts and the estimated movement amounts will be described with reference to FIGS. 5(*a*) and 5(*b*).

Figure 5B:
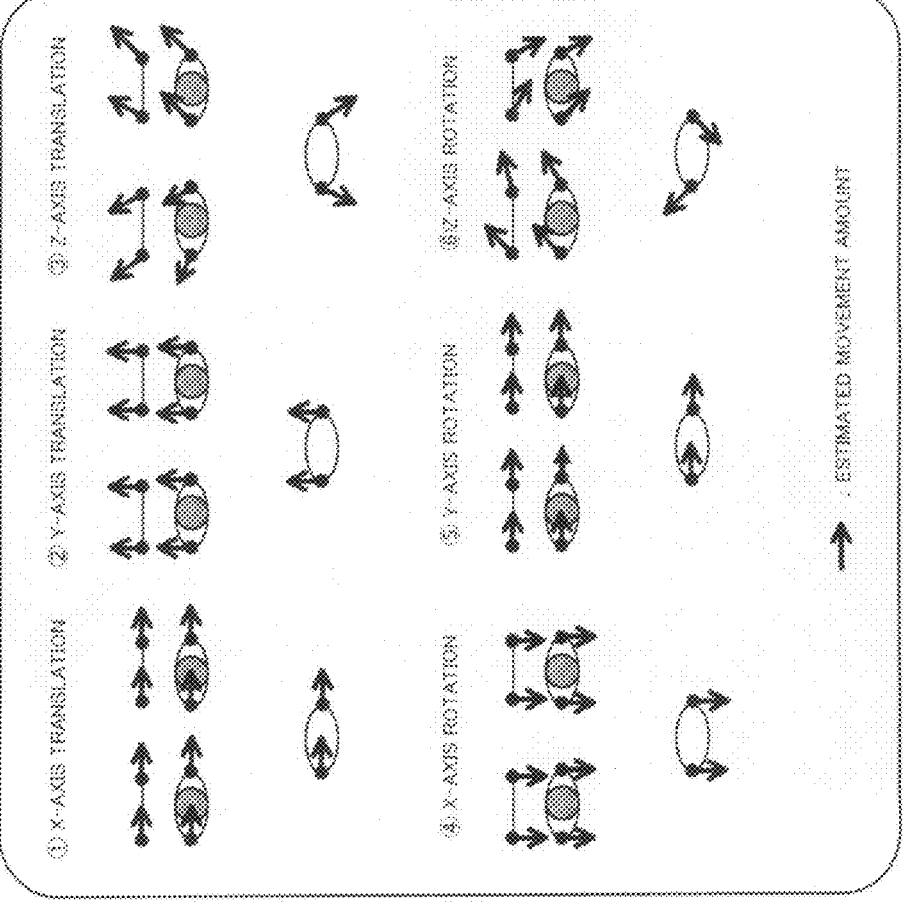
FIG. 5($a$) is an explanatory view of actual movement amounts, and FIG. 5($b$) is an explanatory view of estimated movement amounts.
Figure 5A:
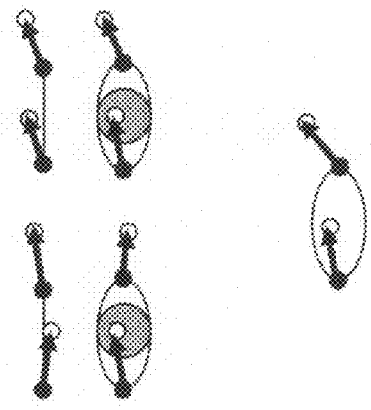

As illustrated in FIG. 5(*a*), the actual movement amount is a distance between the position (indicated by ● in FIG. 5(*a*))

of the feature of the three-dimensional model in the previous frame when projected on the two-dimensional plane and the position (indicated by ○ in FIG. 5(a)) of the feature of the three-dimensional model in the present frame when projected on the two-dimensional plane. On the other hand, as illustrated in FIG. 5(b), the estimated movement amount is how much distance the position of the feature of the three-dimensional model in the previous frame when projected on the two-dimensional plane is estimated to move when any of the six standard motions is made.

The three-dimensional displacement estimating section 7 associates the estimated movement amounts with the actual movement amounts, to obtain coefficients $a_1$ through $a_6$ in the following linear equation (2):

(Actual movement amount)=$a_1$×(estimated movement amount corresponding to X-axis translation)+$a_2$×(estimated movement amount corresponding to Y-axis translation)+$a_3$×(estimated movement amount corresponding to Z-axis translation)+$a_4$×(estimated movement amount corresponding to X-axis rotation)+$a_5$×(estimated movement amount corresponding to Y-axis rotation)+$a_6$×(estimated movement amount corresponding to Z-axis rotation)   Equation (2).

As shown in the motion table of FIG. 4, the estimated movement amount is expressed by a vector that indicates respective moving distances of the feature with respect to the X-axis and Y-axis. In other words, one estimated movement amount includes two parameters. Meanwhile, since the number of the unknown coefficients ($a_1$ through $a_6$) in Equation (2) is six, the coefficients $a_1$ through as can be obtained in a case where estimated movement amounts and actual movement amounts regarding a minimum of three features have been obtained. It should be noted that in a case where estimated movement amounts and actual movement amounts regarding at least four features have been obtained, the coefficients $a_1$ through as may be calculated by using an interpolation method such as least-squares method.

Then, on the basis of the coefficients $a_1$ through $a_6$, it is possible to determine how the tracking object has moved. That is, the foregoing six standard motions correspond to six degrees of freedom which movement of the three-dimensional model has, respectively. Therefore, by obtaining the coefficients $a_1$ through $a_6$, it is possible to obtain how much the three-dimensional model has moved with respect to each of the six degrees of freedom.

5. Accuracy Evaluation Test

The following will describe a tracking accuracy evaluation test in a case where the monocular camera 9 is adopted in the tracking device 1 of the present embodiment.

Figure 6A:
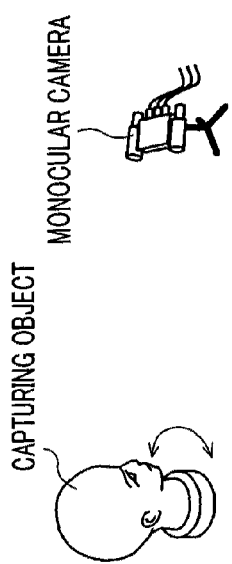
FIGS. 6($a$) through 6($c$) are explanatory views of tracking accuracy evaluation test of the tracking device illustrated in FIG. 1.
Figure 6B:
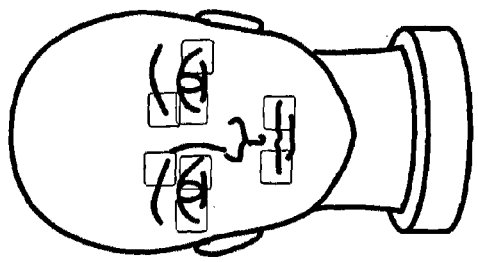

For the tracking accuracy evaluation test, as illustrated in FIG. 6(a), an image of a dummy as the capturing object was captured by a monocular camera. At this time, the head of the dummy was waggled from side to side by a motor. The image captured by the monocular camera is illustrated in FIG. 6(b). As illustrated in FIG. 6(b), images of inner and outer corners of eyes, for example, are surrounded by boxes. This indicates that the images of inner corners of eyes, for example, are extracted as the tracking object images.

Figure 6C:
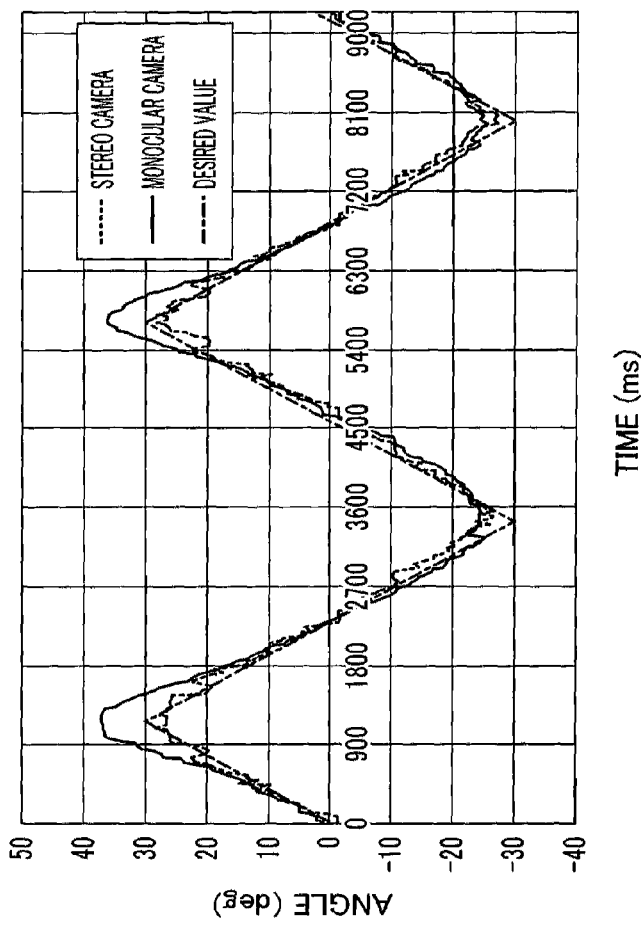

FIG. 6(c) is a graph illustrating tracking accuracy of the tracking device 1 of the present embodiment, as compared with tracking accuracy of the arrangement in which a stereo camera was used. In FIG. 6(c), a full line indicates tracking accuracy with the use of a monocular camera in the tracking device 1 of the present embodiment, and a doted line indicates tracking accuracy obtained with the user of a stereo camera. A dashed line indicates a desired value of tracking accuracy.

As is apparent from the graph shown in FIG. 6(c), change of a waggling angle of the dummy is sufficiently tracked even with the use of the monocular camera although tracking accuracy obtained with the use of the monocular camera is inferior to tracking accuracy obtained with the use of the stereo camera. Thus, by adopting the monocular camera for the tracking device of the present embodiment, it is practically possible to obtain tracking accuracy that is by no means inferior to tracking accuracy obtained with the use of the stereo camera.

6. Supplementary Explanation

Thus, the tracking device 1 of the present embodiment includes: the tracking object image extracting section 2 that extracts a tracking object image, which represents a tracking object, from an image captured by the monocular camera 9; the two-dimensional displacement calculating section 6 that calculates, as actual movement amounts, amounts of inter-frame movement of the tracking object image; the two-dimensional plane projecting section 3 that generates on a two-dimensional plane a projected image of a three-dimensional model, which represents in three dimensions a capturing object captured by the monocular camera 9; the small motion generating section 4 that calculates, as estimated movement amounts, amounts of inter-frame movement of the projected image; and the three-dimensional displacement estimating section 7 that estimates amounts of three-dimensional motion of the tracking object on the basis of the actual movement amounts and the estimated movement amounts.

According to the above arrangement, the two-dimensional displacement calculating section 6 calculates the actual movement amounts of the tracking object image extracted by the tracking object image extracting section 2. Meanwhile, the small motion generating section 4 calculates the estimated movement amounts from the projected image of the three-dimensional model generated by the two-dimensional plane projecting section 3.

What the actual movement amounts and the estimated movement amounts have in common is that they are values indicating amounts of inter-frame movement of the capturing object captured by the monocular camera 9. Especially, the actual movement amount is a value obtained on the basis of an image captured by the monocular camera 9. Therefore, it can be understood that the actual movement amount is a value two-dimensionally indicating the amount that the tracking object has actually moved. The estimated movement amount is a value calculated from the three-dimensional model of the capturing object. Therefore, it can be said that the estimated movement amount is a value three-dimensionally indicating movement of the tracking object.

Thus, the three-dimensional displacement estimating section 7 can estimate the amounts of three-dimensional motion of the tracking object by matching the actual movement amounts and the estimated movement amounts, when actual movement occurs. In addition, since the tracking device 1 uses the three-dimensional model of the capturing object, it is possible to estimate the amounts of motion of the tracking object with accuracy.

Besides, since the tracking device 1 uses the monocular camera 9, it is possible to measure three-dimensional motion of the tracking object at low cost, and the tracking device 1 can be used in a small space.

Further, the small motion generating section 4 calculates as the estimated movement amounts respective amounts of movement of the projected image when the three-dimensional model moves, with respect to six degrees of freedom regarding movement of the three-dimensional model. Therefore, it is possible to accurately calculate three-dimensional movement of the three-dimensional model.

Still further, since the three-dimensional displacement estimating section 7 estimates the amounts of motion by using a linear equation in which the actual movement amounts and the estimated movement amounts are associated with each other, it is possible to estimate the amounts of three-dimensional motion of the tracking object by a simple process. Therefore, it is possible to measure three-dimensional motion of the tracking object by an efficient process.

The processes of the foregoing means in the tracking device 1 of the present embodiment are realized in the following manner: CPU or computing means executes a program stored in storage means such as ROM (Read Only Memory) and RAM (Random Access Memory), so as to control input means such as a keyboard, output means such as a display, and communication means such as an interface circuit.

Thus, the computer having these means can realize various kinds of processes of the tracking device 1 of the present embodiment only by reading a storage medium in which the program is stored and executing the program. With the program stored in a removable storage medium, it is possible to realize the above-mentioned various kinds of functions and processes on any computer.

The storage medium may be a memory (not shown) for process steps on a microcomputer. For example, the program medium may be something like a ROM. Alternatively, the program medium may be such that a program reader device (not shown) as an external storage device may be provided in which a storage medium is inserted for reading.

In any case, the stored program is preferably executable on access by a microprocessor. Further, it is preferred if the program is retrieved, and the retrieved program is downloaded to a program storage area in a microcomputer to execute the program. The download program is stored in a main body device in advance.

In addition, the program medium may be a storage medium constructed separably from a main body. The medium may be tape based, such as a magnetic tape or cassette tape; disc based, such as a flexible disc or hard disk including a magnetic disc and CD/MO/MD/DVD; card based, such as an IC card (including a memory card); or a semiconductor memory, such as a mask ROM, EPROM (Erasable Programmable Read Only Memory), EEPROM (Electrically Erasable Programmable Read Only Memory), and a flash ROM. All these types of media hold the program in a fixed manner.

In contrast, if the system is arranged to connect to the Internet or another communication network, the medium is preferably a storage medium which holds the program in a flowing manner so that the program can be downloaded over the communication network.

Further, if the program is downloaded over a communication network in this manner, it is preferred if the download program is either stored in a main body device in advance or installed from another storage medium.

Further, it is preferable that the estimated movement amount calculating means calculates, as the estimated movement amounts, respective amounts of movement of the projected image when the three-dimensional model moves, with respect to six degrees of freedom regarding movement of the three-dimensional model.

This is because three-dimensional movement is basically expressed by six degrees of freedom. According to the above arrangement, since the estimated movement amount calculating means calculates respective estimated amounts of movement of the three-dimensional model when the three-dimensional model makes movements with respect to six degrees of freedom, it is possible to accurately calculate three-dimensional movement of the three-dimensional model.

Accordingly, according to the above arrangement, it is possible to accurately calculate three-dimensional motion of the tracking object.

Still further, it is preferable that the three-dimensional displacement estimating means estimates the amount of motion by using a linear equation in which the actual movement amount and the estimated movement amounts are associated with each other.

According to the above arrangement, since the actual movement amount and the estimated movement amounts are associated with each other in the linear equation, it is possible to estimate the amounts of three-dimensional motion of the tracking object by a simple process. Therefore, it is possible to measure three-dimensional motion of the tracking object by an efficient process.

A motion measuring device of the present invention can be arranged as a motion measuring system which is provided with a monocular camera.

Further, since the motion measuring system can be installed in a small space, the motion measuring system is suitably mounted in an in-vehicle device. By measuring motion of a driver with the use of the in-vehicle device having the motion measuring system of the present invention mounted therein, it is possible to operate other in-vehicle device while taking hands off the in-vehicle device, and to give a warning against a drowsy driver.

With the motion measurement program which causes a computer to function as the foregoing means of the above-arranged motion measuring device, it is possible to obtain effects similar to the effect of the motion measuring device of the present invention by using a computer. Moreover, by storing the motion measurement program in a computer-readable storage medium, it is possible to execute the motion measurement program on any computer.

INDUSTRIAL APPLICABILITY

A motion measuring device of the present invention can be used in various industries. The following will describe specific examples of industries in which the present invention can be used.

For example, the motion measuring device of the present invention is suitably used for the purpose of measuring motion of a vehicle driver. This is because it is preferable that the driver can operate an in-vehicle device such as a car navigation without taking hands off a steering wheel, considering that the driver should basically concentrate on driving. In addition, an available space for the in-vehicle device in a vehicle is limited.

With regard to this, with the use of the motion measuring device of the present invention, it is possible to detect motion of a driver with sufficient accuracy by using a compact monocular camera. Thus, it is possible to easily mount the motion measuring device in a vehicle. Moreover, by detecting motion of a user with the use of the motion measuring device of the present invention, it is possible to operate the in-vehicle device without taking hands off a steering wheel.

Also, in terms of driver's safety, the motion measuring device of the present invention is advantageous. That is, with the use of the motion measuring device of the present invention, it is also possible to detect whether the driver is drowsing while driving, and to give a warning to the driver, if necessary.

Further, the motion measuring device of the present invention can be used as a computer interface. That is, by using a commercially available web camera as a monocular camera in such a manner that the web camera is connected to the motion measuring device of the present invention, it is possible to easily measure motion of a user of a computer. With this arrangement, it is possible to use user's motion measured by the motion measuring device of the present invention in video chat games and online multiplayer games.

The invention claimed is:

1. A motion measuring device comprising:
   a processor; and
   a memory configured to store instructions that, when executed by the processor, cause the processor to extract a tracking object image, which represents a tracking object, from a motion image captured by a monocular camera, on the basis of a feature of the tracking object;
   calculate amounts of inter-frame movement of the feature of the tracking object image, as actual movement amounts;
   generate on a two-dimensional plane a projected image of a three-dimensional model, which represents in three dimensions a capturing object captured by the monocular camera;
   calculate, as estimated movement amounts, amounts of inter-frame movement of a point of the projected image which point corresponds to the feature, the amounts of inter-frame movement being calculated with respect to respective six standard movements of the three-dimensional model, when the three-dimensional model makes movements respectively corresponding to the six standard movements; and
   estimate amounts of three-dimensional motion of the tracking object respectively corresponding to the six standard movements, by using a linear equation in which the actual movement amount and the estimated movement amounts are associated with each other.

2. A motion measuring system comprising: the motion measuring device according to claim 1; and the monocular camera.

3. An in-vehicle device having the motion measuring system according to claim 2 mounted therein.

4. A non-transitory computer-readable storage medium storing a motion measurement program for causing a computer to function as the foregoing processor of the motion measuring device according to claim 1.

5. A motion measuring method comprising:
   a first step of extracting a tracking object image, which represents a tracking object, from a motion image captured by a monocular camera, on the basis of a feature of the tracking object;
   a second step of calculating, as actual movement amounts, amounts of inter-frame movement of the feature of the tracking object image;
   a third step of generating on a two-dimensional plane a projected image of a three-dimensional model, which represents in three dimensions a capturing object captured by the monocular camera;
   a fourth step of calculating, as estimated movement amounts, amounts of inter-frame movement of a point of the projected image which point corresponds to the feature, as the amounts of inter-frame movement being calculated with respect to respective six standard movements of the three-dimensional model, when the three-dimensional model makes movements respectively corresponding to the six standard movements; and
   a fifth step of estimating amounts of three-dimensional motion of the tracking object respectively corresponding to the six standard movements, by using a linear equation in which the actual movement amount and the estimated movement amounts are associated with each other.

* * * * *